(12) United States Patent
Chen et al.

(10) Patent No.: US 12,358,156 B2
(45) Date of Patent: Jul. 15, 2025

(54) AFFECTIVE COMPUTING METHOD FOR INTERACTIVE ROBOT, AND RELATED DEVICE

(71) Applicant: Mind with Heart Robotics Co., Ltd., Guangdong (CN)

(72) Inventors: Gong Chen, Guangdong (CN); Geling Huang, Guangdong (CN); Jiaming Zhang, Guangdong (CN)

(73) Assignee: Mind with Heart Robotics Co., Ltd., Shenzhen (CN)

( * ) Notice: Subject to any disclaimer, the term of this patent is extended or adjusted under 35 U.S.C. 154(b) by 0 days.

(21) Appl. No.: 18/869,299

(22) PCT Filed: May 26, 2023

(86) PCT No.: PCT/CN2023/096571
§ 371 (c)(1),
(2) Date: Nov. 26, 2024

(87) PCT Pub. No.: WO2024/148737
PCT Pub. Date: Jul. 18, 2024

(65) Prior Publication Data
US 2025/0108516 A1 Apr. 3, 2025

(30) Foreign Application Priority Data
Jan. 10, 2023 (CN) .......................... 202310031786.2

(51) Int. Cl.
*B25J 11/00* (2006.01)
*B25J 9/16* (2006.01)
*G06N 3/006* (2023.01)

(52) U.S. Cl.
CPC ............. *B25J 11/001* (2013.01); *B25J 9/163* (2013.01); *G06N 3/006* (2013.01)

(58) Field of Classification Search
CPC ........ B25J 11/001; B25J 9/163; B25J 9/0003; B25J 9/0006; B25J 9/1628; B25J 9/1653;
(Continued)

(56) References Cited

U.S. PATENT DOCUMENTS

2018/0229372 A1  8/2018 Breazeal et al.
2018/0326589 A1* 11/2018 Grollman ............... G06N 3/008
(Continued)

FOREIGN PATENT DOCUMENTS

| CN | 105807933 A | 7/2016 |
| CN | 114995657 A | 9/2022 |
| CN | 116028624 A | 4/2023 |

OTHER PUBLICATIONS

International Search Report of PCT Patent Application No. PCT/CN2023/096571 issued on Sep. 9, 2023.
(Continued)

*Primary Examiner* — Abby Y Lin
*Assistant Examiner* — Esvinder Singh

(57) ABSTRACT

The present application provides an affective computing method for an interactive robot, and a related device. The affective computing method comprises: acquiring perception information in the present round of man-machine interaction and an intention set of an interactive robot; determining a perception result corresponding to a plurality of affective evaluation dimensions; obtaining an error signal; and finally determining the affective state of the interactive robot in the next round of man-machine interaction. The embodiments determine the perception result used for representing the robot perceiving a user, then determine the error signal in light of the intention set obtained on the basis of the personality and emotion of the interactive robot itself, and adjust the affective state of the interactive robot, thereby highly simulating the human affective processes so as to satisfy the affective needs of the user during the man-machine interaction process and improve user experience.

15 Claims, 6 Drawing Sheets

(58) Field of Classification Search
CPC ... B25J 11/0005; B25J 11/0015; G06N 3/006; G06N 3/004; G06N 3/008; G05B 2219/33056; G05B 2219/36488; G05B 2219/40408
See application file for complete search history.

(56) References Cited

U.S. PATENT DOCUMENTS

| | | | |
|---|---|---|---|
| 2020/0272810 A1* | 8/2020 | Asa | G06F 3/14 |
| 2021/0191506 A1* | 6/2021 | Wang | G06F 3/017 |
| 2024/0220827 A1* | 7/2024 | Matsumura | G06N 3/006 |

OTHER PUBLICATIONS

Written Opinion of PCT Patent Application No. PCT/CN2023/096571 issued on Sep. 9, 2023.
Ting Yan et al., AppraisalCloudPCT: A Computational Model of Emotions for Socially Interactive Robots for Autistic Rehabilitation, Computational Intelligence and Neuroscience, Mar. 7, 2023, pp. 1-25, vol. 2023, Hindawi.
Ognjen Rudovic et al., Personalized Machine Learning for Robot Perception of Affect and Engagement in Autism Therapy, Science Robotics, Jun. 27, 2018, pp. 1-11, vol. 3.

* cited by examiner

AFFECTIVE COMPUTING METHOD FOR INTERACTIVE ROBOT, AND RELATED DEVICE

TECHNICAL FIELD

The present disclosure relates to the technical field of artificial intelligence, and in particular to an affective computing method for an interactive robot, and a related device.

BACKGROUND ART

With the development of artificial intelligence technology, the main task of the new generation interactive robot is to have a certain human emotion, so that it can meet the affective needs of users in man-machine interaction in a manner behaving more like real human.

How to provide an affective computing method of an interactive robot which can highly simulate the human affective process to meet users' affective needs in the man-machine interaction becomes an urgent technical problem.

SUMMARY OF THE INVENTION

The main purpose of the embodiments of the present disclosure is to provide an affective computing method for an interactive robot, the interactive robot, and a computer-readable storage medium, which can highly simulate human affective processes so as to meet the affective needs of a user in a man-machine interaction process and improve the user experience.

In order to achieve the above object, a first aspect of an embodiment of the present disclosure proposes an affective computing method for an interactive robot, the method including:
  acquiring an intention set of an interactive robot, wherein the intention set is determined on the basis of a plurality of affective evaluation dimensions and event evaluation tendency information corresponding to each of the affective evaluation dimensions, and the affective evaluation dimensions are determined on the basis of personality characteristic information of the interactive robot;
  acquiring perception information in the present round of man-machine interaction and, according to the perception information, obtaining a perception result corresponding to the plurality affective evaluation dimensions;
  according to the perception result and the intention set of the interactive robot, obtaining an error signal; and
  on the basis of the error signal, determining the affective state of the interactive robot in the next round of man-machine interaction.

According to the affective computing method for the interactive robot provided in some embodiments of the present disclosure, the, according to the perception information, obtaining a perception result corresponding to the plurality affective evaluation dimensions includes: obtaining recognition results of a plurality of pattern recognition types according to the perception information; and determining perception results corresponding to the plurality of affective evaluation dimensions based on recognition results of the plurality of pattern recognition types.

According to the affective computing method for the interactive robot provided in some embodiments of the present disclosure, the, on the basis of the error signal, determining the affective state of the interactive robot in the next round of man-machine interaction includes:
  obtaining an affective state of the interactive robot in a next round of man-machine interaction according to a mood vector and the error signal of the interactive robot; and
  determining an affective strength and a duration of the affective state based on a magnitude of the error signal.

According to the affective computing method for the interactive robot provided in some embodiments of the present disclosure, after the, on the basis of the error signal, determining the affective state of the interactive robot in the next round of man-machine interaction, the method further includes:
  outputting a response to a user by the interactive robot according to the affective state.

According to the affective computing method for the interactive robot provided in some embodiments of the present disclosure, the event evaluation tendency information is determined by emotion cognition information and a pre-set interaction strategy of the interactive robot;
  wherein the interaction strategy is used for updating personality characteristic information about the interactive robot.

According to the affective computing method for the interactive robot provided in some embodiments of the present disclosure, after the, on the basis of the error signal, determining the affective state of the interactive robot in the next round of man-machine interaction, the method further includes:
  updating the emotion cognition information about the interactive robot based on the affective state to obtain updated emotion cognition information;
  wherein the updated emotion cognition information is used for determining the intention set of the interactive robot in the next round of man-machine interaction.

According to the affective computing method for the interactive robot provided in some embodiments of the present disclosure, after the obtaining recognition results of a plurality of pattern recognition types according to the perception information, the method further includes:
  obtaining environment understanding information and user understanding information according to the recognition results of the plurality of pattern recognition types; and
  updating the interaction strategy based on the environment understanding information and the user understanding information to obtain an updated interaction strategy;
  wherein the updated interaction strategy is used for determining the intention set of the interactive robot in the next round of man-machine interaction.

According to the affective computing method for the interactive robot provided in some embodiments of the present disclosure, after the acquiring perception information in the present round of man-machine interaction, the method further includes:
  uploading the perception information to a pre-set cloud evaluation system, so as to predict the user affective state and a user engagement interaction level according to the perception information via the cloud evaluation system; and
  updating the interaction strategy based on the user affective state and the user engagement interaction level to obtain updated interaction strategy;

wherein the updated interaction strategy is used for determining the intention set of the interactive robot in the next round of man-machine interaction.

According to the affective computing method for the interactive robot provided in some embodiments of the present disclosure, the method further includes:

uploading at least one of the environment understanding information, the user understanding information, the user affective state and the user engagement interaction level to a pre-set cloud sharing system;

wherein the cloud sharing system is configured for storing the environment understanding information, the user understanding information, the user affective state and the user engagement interaction level as sharing information, and providing the sharing information to an interaction robot communicatively connected to the cloud sharing system.

According to the affective computing method for the interactive robot provided in some embodiments of the present disclosure, the perception information includes user perception information and environment perception information;

wherein the user perception information includes at least one of user touch information, user attention information, user action information and user voice information; and the environment perception information includes at least one of noise and interference information and context prompt information.

To achieve the above object, a second aspect of an embodiment of the present disclosure proposes an electronic device including a memory, a processor, and a computer program stored on the memory and executable on the processor. The computer program when executed by the processor implements the method of the above first aspect.

To achieve the above object, a third aspect of an embodiment of the present disclosure proposes a storage medium. The storage medium is a computer-readable storage medium for computer-readable storage. The storage medium stores one or more computer programs executable by one or more processors to implement the method of the above first aspect.

The present disclosure proposes an affective computing method for an interactive robot, the interactive robot and a computer storage medium. The affective computing method includes: acquiring perception information in the present round of man-machine interaction and an intention set of an interactive robot, wherein the intention set is determined on the basis of a plurality of affective evaluation dimensions and event evaluation tendency information corresponding to each of the affective evaluation dimensions, and the affective evaluation dimensions are determined on the basis of personality characteristic information of the interactive robot; determining perception results corresponding to the plurality of affective evaluation dimensions based on the perception information; obtaining an error signal according to the perception result and the intention set of the interactive robot; and, on the basis of the error signal, finally determining the affective state of the interactive robot in the next round of man-machine interaction. The embodiments of the present disclosure determine, according to the perception information generated during the man-machine interaction process, the perception result used for representing the robot perceiving a user, then determine the error signal in light of the intention set obtained on the basis of the personality and emotion of the interactive robot itself, and adjust the affective state of the interactive robot according to the error signal, thereby highly simulating the human affective processes so as to satisfy the affective needs of the user during the man-machine interaction process and improve user experience.

DETAILED DESCRIPTION OF THE INVENTION

For that the objects, aspects and advantages of the disclosure may be more clearly understood, a more particular description of the disclosure may be had by reference to the appended drawings and embodiments. It should be understood that the specific examples described herein are merely used for explanation of the invention and are not intended to be limiting thereof.

With the development of artificial intelligence technology, the main task of the new generation interactive robot is to have a certain human emotion, so that it can meet the affective needs of users in man-machine interaction in a manner behaving more like real human.

How to provide an affective computing method of an interactive robot which can highly simulate the human affective process to meet users' affective needs in the man-machine interaction becomes an urgent technical problem.

Based on this, the embodiments of the present disclosure provide an affective computing method for an interactive robot, which can highly simulate human affective processes so as to meet the affective needs of a user in a man-machine interaction process and improve the user experience.

Figure 6:
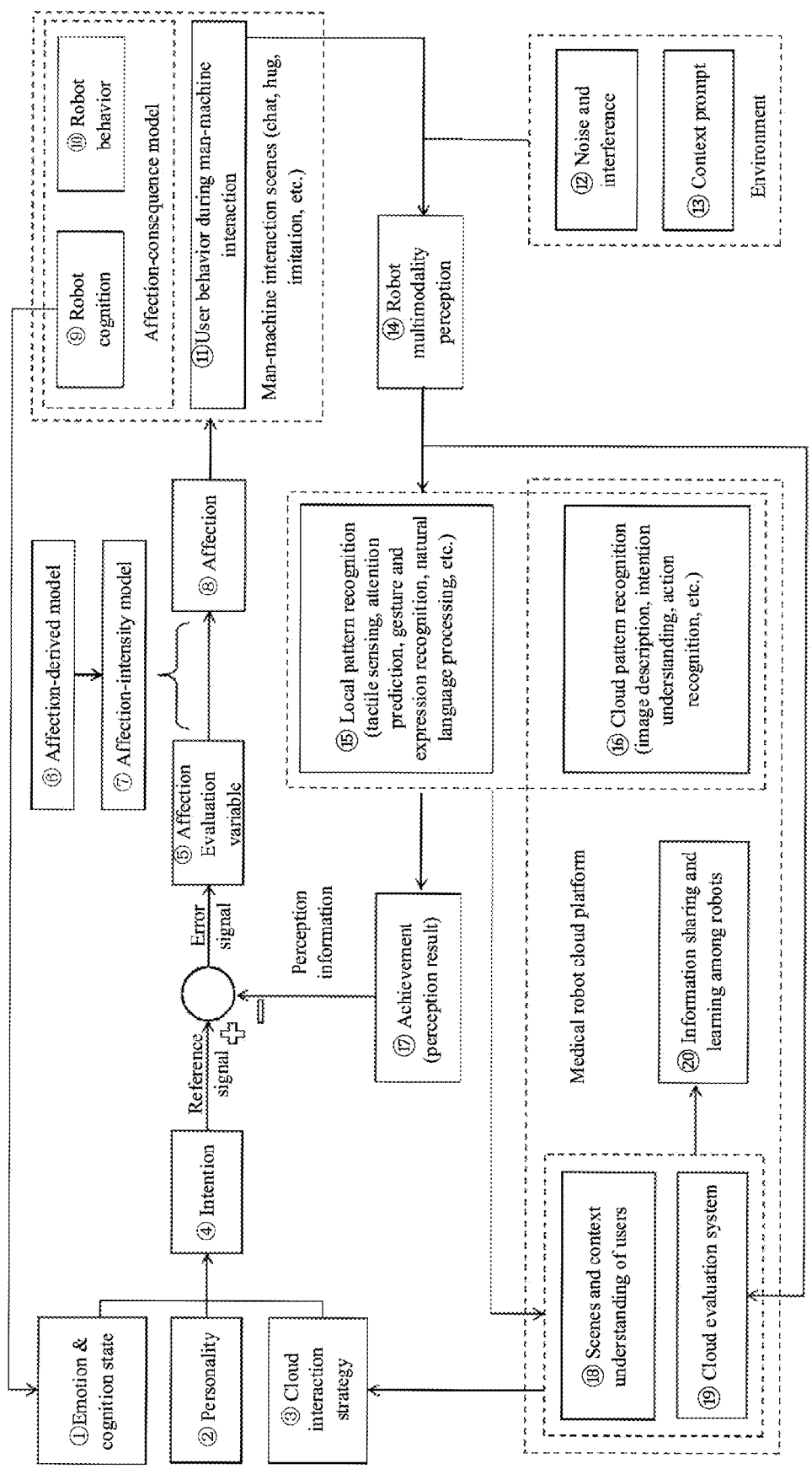
FIG. 6 is a structurally schematic diagram of an affective computing model for an interactive robot according to an embodiment of the present disclosure.

The affective computing method for the interactive robot provided in an embodiment of the present disclosure is described below by means of an affective computing model. With reference to FIG. 6, FIG. 6 is a structurally schematic diagram of an affective computing model for an interactive robot according to an embodiment of the present disclosure. As shown in FIG. 6, the affective computing model includes 20 models, from codes 1 to 20, including:

"emotion and cognition state", "personality", "cloud interaction strategy", "intention", "affection assessment variable", "affection-derivation model", "affection-intensity model", "affection", "robot cognition", "robot behavior", "user behavior during man-machine interaction", "noise and interference", "context prompt", "robot multimodality perception", "local pattern recognition", "cloud pattern recognition", "achievement (perception result)", "context understanding of scenes and users", "cloud evaluation system", and "information sharing and learning among robots".

(1) The sub-models numbered 4-17 constitute the main recursive control loop for the robot to process affection information, because it adopts the component model method of affection perception control theory and evaluation model.

(2) The sub-models numbered 1-3 constitute how the robot evaluates the intention of the event (i.e., the evaluation mode of interactive process). Here, the evaluation appraisal patterns of the nine appraisal dimensions of the interaction process are influenced by the robot's emotions and personality as well as interaction strategies.

By these three sub-models, namely "emotion and cognition state", "personality" and "cloud interaction strategy" to form the intention of the robot, the whole affective computing model is finally enabled to achieve a high degree of simulation of the whole process of human affection (e.g., intention generation, and generation, regulation and response to stimuli of affection).

(3) The sub-models numbered 16-20 constitute a "medical robot cloud platform".

(4) The sub-models numbered 12-13 show that the robot not only takes into account the influence of the external environment (e.g., noise, interference, context clues) on the user during the interaction, but also responds appropriately to the surrounding background.

Each sub-model is computable, which makes the affective computing model highly computable as a whole.

Figure 7:
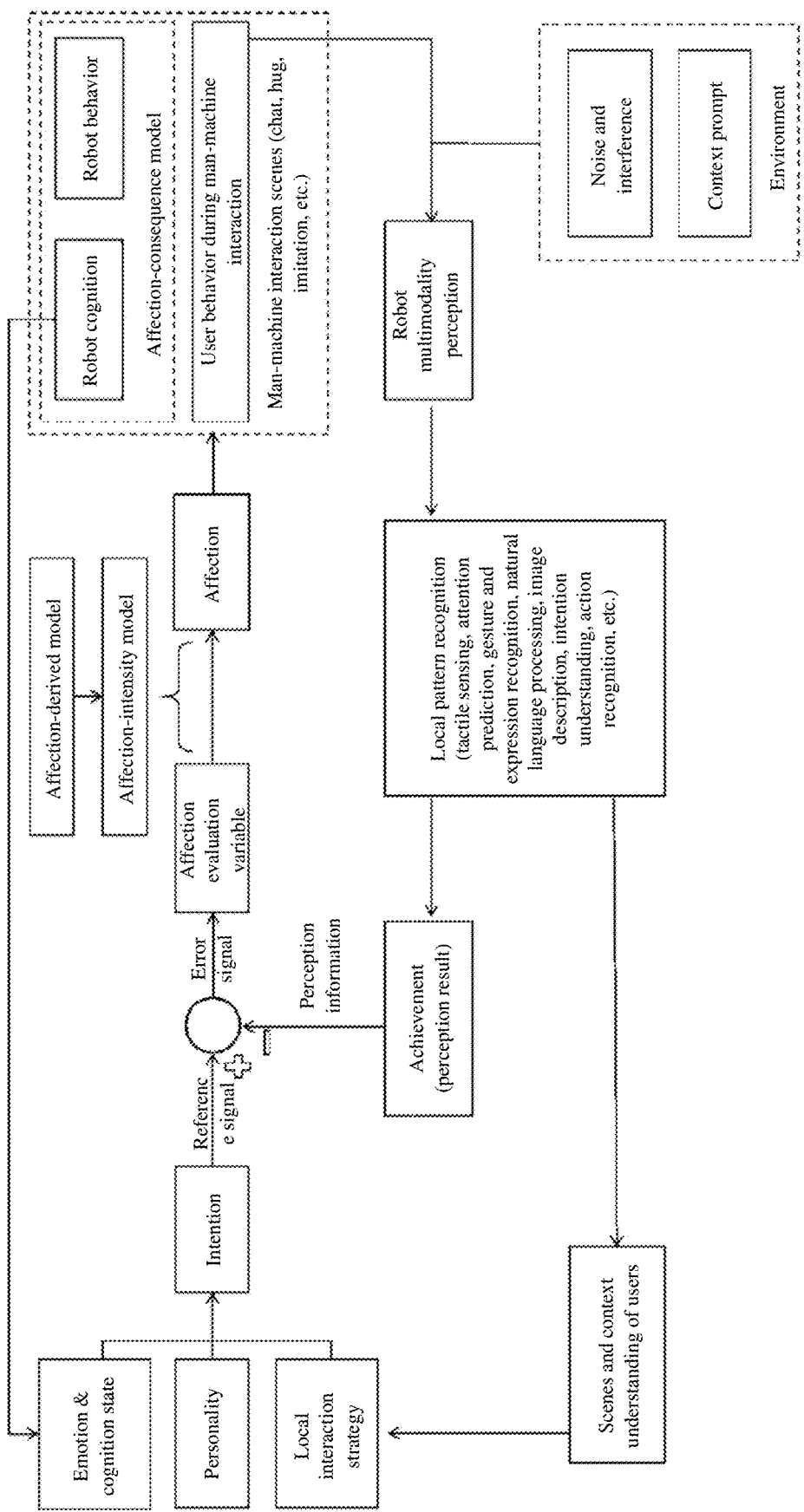
FIG. 7 is a structurally schematic diagram of an affective computing model for an interactive robot according to another embodiment of the present disclosure.

In some embodiments, reference is made to FIG. 7, which shows a structurally schematic diagram of an affective computing model for an interactive robot according to another embodiment of the present disclosure. As shown in FIG. 7, there is no relevant sub-model of the "medical robot cloud platform", such as "cloud evaluation system", "information sharing and learning between robots" and "cloud pattern recognition". The sub-model "local pattern recognition" inherits part of the function of "cloud model recognition". Accordingly, in the new model, the original sub-model "cloud interaction strategy" becomes "local interaction strategy".

Figure 1:
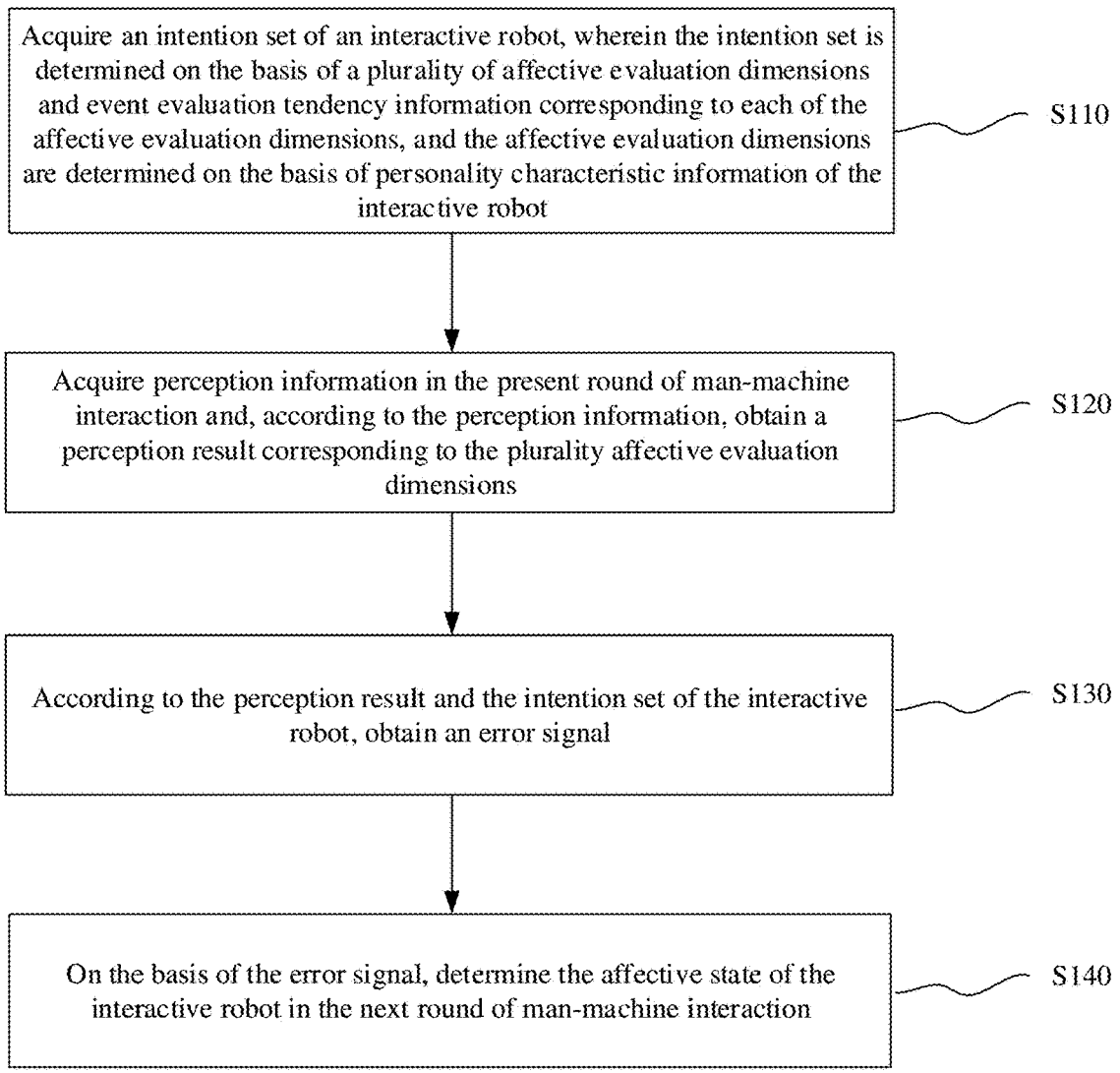
FIG. 1 is a schematic flow diagram of an affective computing method for an interactive robot according to an embodiment of the present disclosure.

With reference to FIG. 1, FIG. 1 is a schematic flow diagram of an affective computing method for an interactive robot according to an embodiment of the present disclosure. As shown in FIG. 1, the affective computing method for the interactive robot includes:

step S110, acquiring an intention set of an interactive robot, wherein the intention set is determined on the basis of a plurality of affective evaluation dimensions and event evaluation tendency information corresponding to each of the affective evaluation dimensions, and the affective evaluation dimensions are determined on the basis of personality characteristic information of the interactive robot;

step S120, acquiring perception information in the present round of man-machine interaction and, according to the perception information, obtaining a perception result corresponding to the plurality affective evaluation dimensions;

step S130, according to the perception result and the intention set of the interactive robot, obtaining an error signal; and step S140, on the basis of the error signal, determining the affective state of the interactive robot in the next round of man-machine interaction.

The embodiments of the present disclosure determine, according to the perception information generated during the man-machine interaction process, the perception result used for representing the robot perceiving a user, then determine the error signal in light of the intention set obtained on the basis of the personality and emotion of the interactive robot itself, and adjust the affective state of the interactive robot according to the error signal, thereby highly simulating the human affective processes so as to satisfy the affective needs of the user during the man-machine interaction process and improve user experience.

In step S110 of some embodiments, the intention set of the robot is obtained by the sub-models "emotion and cognition state", "personality", "cloud interaction strategy"/"local interaction strategy" and "intention".

Specifically, in the "emotion and cognition state" sub-model, the mood vector E is defined as the robot's cognition state (cognitive state) in the PAD mental space, which consists of pleasantness, arousal and dominance axes.

$E=(E_p, E_a, E_d)$, where $E_p$ is the pleasant component of affection, $E_a$ is the arousal component of affection, and $E_d$ is the dominant component of affection. The mood vector M (Mood Vector), which in turn consists of a pleasantness component and an arousal component, can be defined as follows:

$$M = (M_p, M_a, 0);$$

$$M_p = \int E_p d_t;$$

$$\ddot{M}_a + (1 - M_a^2) \dot{M}_a + M_3 = 0;$$

where $M_p$ and $M_a$ are the pleasure component of the emotion and the arousal component of the emotion, respectively. Since the current cognition state affects the emotion pleasantness, $M_p$ is defined as the integral of the emotion pleasantness component.

In addition, since the activation component of the mood vector resembles a human biorhythm, such as an internal clock, $M_a$ is defined by the Van del Pol equation.

In the "personality" sub-model, five personality characteristics, namely, O for Openness, C for Conscientiousness, E for Extraversion, A for Agreeableness, N for Neuroticism, are defined to simulate personality metrics of humans and robots. The five personality characteristics will not only affect affective factors, but also affect affective evaluation mode.

This is followed by three equations of temperament involving pleasantness, arousal and dominance:

$$p_\alpha = 0.21E + 0.59A + 0.19N;$$

$$p_\beta = 0.15O + 0.30A - 0.57N;$$

$$p_\gamma = 0.25O + 0.17C + 0.60E - 0.32A;$$

where $P_\alpha$, $P_\beta$ and $P_\gamma$ represent the values of the pleasantness axis, the arousal axis and the dominance axis, respectively. In addition, O, C, E, A and N (where O, C, E, A, N∈ [−1, 1]) respectively represent five characteristics of personality, namely, openness, conscientiousness, extroversion, agreeableness and neuroticism.

Then, nine affective evaluation dimensions in the theory of affective evaluation are determined according to five personality characteristic information, including: pleasantness, goal conduciveness, effort, perceived control, certainty, agency-self, agency-others, agency-circumstances, unfairness, and moral violation, the nine affective assessment dimensions can be determined by the following equations:

$$\text{Pleasantness}(F_{pl}) = -0.585N + 0.606C;$$

$$\text{Goal-Conduciveness}(F_{gc}) = -0.579N + 0.369C;$$

$$\text{PerceivedControl}(F_{pc}) = -1.281N + 0.923E + 1306C;$$

$$\text{Certainty}(F_c) = -1.203N + 0.880C;$$

$$\text{Agency-Self}(F_{as}) = -0.808A;$$

$$\text{Agency-Others}(F_{ao}) = -0.965C + 0.950O;$$

$$\text{Agency-Circumstances}(F_{ac}) = -0.587C;$$

$$\text{Unfairness}(F_u) = 1.149N - 0.928E - 1.113C;$$

$$\text{Moral Violation}(F_{mv}) = 1.309N - 1.005E - 1.456C - 0.840O;$$

where O, C, E, A, N∈ [−1, 1], each equation characterizes the relationship between an affective evaluation dimension and a combination of five personality characteristics, i.e., the trend of a person with a specific personality characteristic evaluates an event in a specific affective evaluation dimension. For example, in the first two equations, although the evaluation trends for the same event are not identical in the two affective evaluation dimensions, people with low N (i.e., neuroticism) and high C (conscientiousness) are more likely to evaluate an event as pleasantness and goal-conduciveness.

It will be appreciated that once the values for the five personality characteristics are determined, the values for each affective evaluation dimension can also be determined by the nine equations described above.

In the "intention" sub-model, "intention" refers to how a robot intends to evaluate an event (i.e., an evaluation mode for an interaction process) based on the robot's emotion and personality by mapping the output of "emotion and cognition state", "personality", "cloud interaction strategy" into the evaluation mode. Thus, the robot's intention set in this sub-model can be defined as:

$$F_{intention} = (F_{pl} + \Delta pl, F_{gc} + \Delta gc, F_{pc} + \Delta pc, F_c + \Delta c, F_{as} + \Delta as, F_{ao} + \Delta ao, F_{ac} + \Delta ac, F_u + \Delta u, F_{mv} + \Delta mv);$$

where $F_{pl}$, $F_{gc}$, $F_{pc}$, $F_c$, $F_{as}$, $F_{ao}$, $F_{ac}$, $F_u$, $F_{mv}$ respectively characterize the nine affective evaluation dimensions defined in the "personality" sub-model: pleasantness, goal conduciveness, perceptual control, certainty, agent-self, agent-others, agent-environment, unfairness, and moral violation. $\Delta pl$, $\Delta gc$, $\Delta pc$, $\Delta c$, $\Delta as$, $\Delta ao$, $\Delta ac$, $\Delta u$ and $\Delta mv$ respectively characterize the event evaluation tendency information corresponding to each affective evaluation dimension.

In the step S110 of some embodiments, the event evaluation tendency information is determined by emotion cognition information and a pre-set interaction strategy of the interactive robot;

wherein the interaction strategy is used for updating personality characteristic information about the interactive robot.

It can be understood that the interaction strategy includes a cloud interaction strategy and a local interaction strategy.

Specifically, the event evaluation tendency of appraising events information (Δpl, Δgc, Δpc, Δc, Δas, Δao, Δac, Δu, Δmv) respectively characterizes the influence of the sub-model "emotion and cognition state" and "cloud interaction strategy"/"local interaction strategy" in each affective evaluation dimension on the tendency of appraising events (event evaluation tendency). That is to say, the event evaluation tendency information is determined by the pre-set emotion cognition information and the pre-set interaction strategy of the interactive robot.

For the sub-model of "cloud interaction strategy", it outputs an interaction strategy, so that the robot can use the strategy in the next round of interaction with the user "strategy" means that, the robot will be able to change its own emotion and personality, so as to adapt to the user's state and interaction environment and achieve better interaction when considering that the sub-model "cloud evaluation system" supports the specific estimation of the user's affective valence, arousal and engagement levels, and the sub-model "scene and user's background understanding" supports the background understanding of the interaction scene and user. The corresponding executed steps of the "cloud evaluation system" and the "scene and user's background understanding" sub-model and the affective computing method of the interactive robot will be explained later.

In some embodiments, the "cloud interaction strategy" sub-model outputs the following interaction policies.

In order to match the character of the robot with the character of the child, personality characteristic information of the user interacting with the robot will be obtained (i.e., a rating scale with O, C, E, A, N between −1 and 1), and then the character of the robot will be matched with the character of the child, i.e., the personality characteristic information of the robot is updated. It can be understood that when the personality characteristic information of the robot changes, the affective tendency that the robot will experience and the affective evaluation dimension that the robot will use can be predicted by using the sub-models "emotion and cognition state" and "personality".

Alternatively, since the background affects not only the user's perception of the robot's affection but also the personality of the robot, the influence of the background should be considered. First, the role that the robot plays in the tasks of the man-machine interaction scene and the user's expectation of the type of personality that the robot is consistent with such tasks or roles should first be determined. Then, the personality characteristic information of the robot is updated to adapt to the user's expectation.

By updating the personality characteristic information of the robot through the interactive strategy output by its sub-model "cloud interaction strategy", the social and communication characteristics of special user groups such as autistic children or patients with Alzheimer's disease can be considered, and the generality of the affective computing method of the interactive robot can be improved, which is suitable to be applied to social interactive robots, especially robots aiming at special user groups such as the autistic children or patients with Alzheimer's disease.

In step S120 of some embodiments, the perception information includes user perception information and environment perception information;

wherein the user perception information includes at least one of user touch information, user attention information, user action information and user voice information; and the environment perception information includes at least one of noise and interference information and context prompt information.

It will be appreciated that the perception information in this round of man-machine interaction may be obtained by means of the sub-models "during man-machine interaction" and "robot multimodality perception".

In the "user behavior during human-machine interaction" sub-model, the user behavior is defined as a behavior to be generated by a user to adapt/complete/exit the user-robot interaction in a user-robot interaction scene (e.g., conducting a conversation, hugging, or playing a game). Such behavior (e.g., gaze modulation, facial expressions, hand and body gestures, speech expressions) is not only a product of user-robot interaction, but can be influenced by observable body behavior of the robot as defined in the sub-model "robot behavior".

In the "robot multi-modality sensing" sub-model, the robot will sense the user and the environment via various sensors (e.g., camera, microphone array, tactile sensing array, infrared sensor) and multiple modalities (e.g., visual, auditory, and tactile sensing).

Specifically, the noise and interference information and the context prompt information are obtained by "noise and interference" and "noise and interference" sub-models. In the "noise and interference" sub-model, the noise is defined as noise from the surrounding environment (e.g., environmental noise, other voice than the user's voice during the user-robot conversation). The interference is defined as any unexpected event that adversely affects the user-robot interaction, such as a heavy push on the robot, or a person forcing the user to terminate the user-robot interaction in advance. The noise and interference can be detected by sensors that sense the user and the environment as well as self-test sensors (e.g., torque sensors) inside the robot.

Different affective backgrounds (i.e., BBC news, classical music clips, etc. that are consistent or inconsistent with the affective valence of the background) affect the user's perception of the simulated affective expression of the robot, indicating that the facial expression of the robot can be observed in the same way that human facial expressions are observed. Furthermore, when there is a surrounding affective background and the background coincides with the affective valence of the robot's facial expression, the human being is better at recognizing the robot's facial expression than when the background does not coincide with the affective valence of the robot's facial expression. Thus, in the "context prompt" sub-model, the affective valence of the robot's surrounding background (e.g., sound, music, pictures/posters on a wall, video clips on a television) in the interactive scene, i.e., the context prompt information, is obtained.

Figure 2:
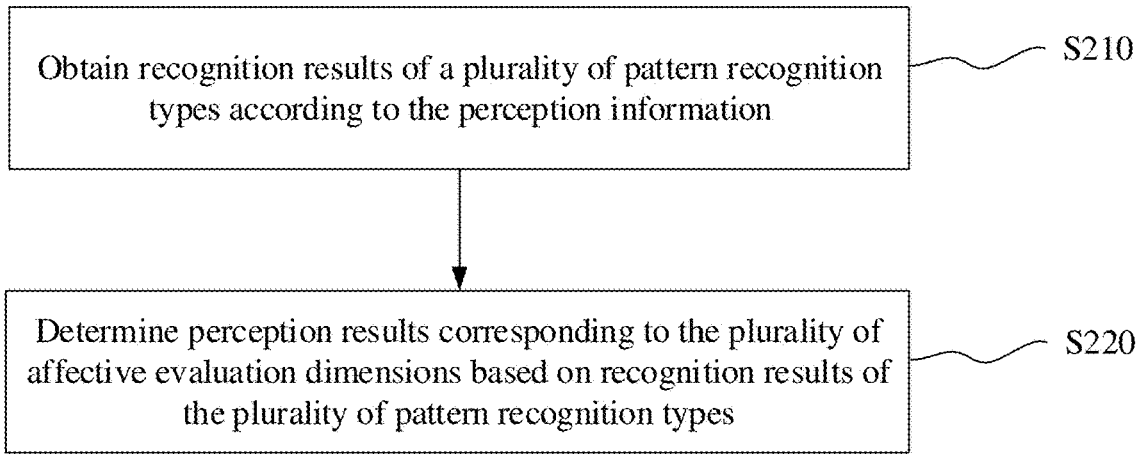
FIG. 2 is a schematic flow diagram of an affective computing method for an interactive robot according to an embodiment of the present disclosure.

In the step S120 of some embodiments, referring to FIG. 2, FIG. 2 is a schematic flow diagram of an affective computing method for an interactive robot according to an embodiment of the present disclosure. As shown in FIG. 2, the, according to the perception information, obtaining a perception result corresponding to the plurality affective evaluation dimensions includes, but is not limited to, steps S210 and S220:

step S210, obtaining recognition results of a plurality of pattern recognition types according to the perception information; and step S220, determining perception results corresponding to the plurality of affective evaluation dimensions based on recognition results of the plurality of pattern recognition types.

For the recognition result of pattern recognition type, it can be determined by "local pattern recognition" and "cloud pattern recognition" sub-models.

Specifically, in the "local pattern recognition" sub-model, the recognition result of the pattern recognition type output according to the perception information and the environment perception information includes "tactile sensing", "attention prediction", "attitude recognition", "facial expression recognition" and "natural language processing".

The output of "Tactile Sensing" is defined as TS=($P_i$, $TB_j$), where $P_i$ represents the $i^{th}$ position on the robot body touched by the user, i.e., $Pi \in$ {Top of Head, Back of Head, Forehead, Left Check, Right Check, Front of Right Forearm, Back of Right Forearm, Front of Right Upper Arm, Back of Right Upper Arm, Back of Left Upper Arm, Front of Left Upper Arm, Back of Left Forearm, Front of Left Forearm, Right Rear Hip, Back of Right Thigh, Inner Right Thigh, Lower Right Thigh, Left Rear Hip, Back of Left Thigh, Inner Left Thigh, Lower Left Thigh}. $TB_j$ is the $j^{th}$ touch behavior pattern of the user, i.e., $TBj \in$ {Random Momentary Tapping, Random Slow Sliding, Finger Sliding, Random Finger Poking, Palm Momentary Tapping}.

The output of the "attention prediction" (i.e., gaze and head direction estimation) is defined as AP=(dl, dr, dh), where the parameters dl, dr are the gaze directions of the user's left and right eyes, respectively, and the parameter dh represents the head direction.

The "gestures recognition" is defined as GR=($HG_i$, $BG_j$), where $HG_i$ is the user's hand gesture, i.e., $HGi \in$ {OK, Peace, Punch, Stop, Nothing}; $BG_j$ is the user's body gesture, i.e., $BG_j \in$ {Standing, Walking, Running, Jumping, Sitting, Squatting, Kicking, Punching, Waving, None}.

The output of facial expressions recognition is defined as $FE_i \in$ {Happiness, Sadness, Anger, Surprise, Fear, Disgust, Neutral}.

The "natural language processing" (NLP) is defined as a related word or stem (PWs, AC) in a natural language that can distinguish 36 affective categories, wherein the PWs represents all the related words or stem that can be extracted from a conversation; affective category AC∈{Admiration/Awe, Amusement, Anger, Anxiety, Being, touched, Boredom, Compassion, Contempt, Contentment, Desperation, Disappointment, Disgust, Dissatisfaction, Envy, Fear, Feeling, Gratitude, Guilt, Happiness, Hatred, Hope, Humility, Interest/Enthusiasm, Irritation, Jealousy, Joy, Longing, Lust, Pleasure/Enjoyment, Pride, Relaxation/Serenity, Relief, Sadness, Shame, Surprise, Tension/Stress, Positive, Negative, Neutral} (i.e., 36 affective categories plus neutral categories).

Specifically, in the "cloud mode recognition" sub-model, the recognition result of the pattern recognition type output according to the perception information and the environment perception information includes "image description", "intention understanding" and "behavior recognition".

The output of the "image captioning" is defined as IC=(Ob, Pr, At), where Ob represents the target object of interest to the user's attention, the region of which can be represented by the attention map of the image captured by the robot camera, Pr represents the preposition, and At represents the properties of the target object.

The output of "intention understanding" is defined as IU=(Insi, TO, DP, RCL), where Insi is one of the three natural language instructions given by the user, namely, Insi∈ {Clear Type, Vague Type, Feeling Type}; TO represents a target object among a plurality of objects in front of the robot; DP represents the delivery location to which the target object should be delivered; the structured language RCL that the robot can understand is in the format "Grasp TO to DP".

"Action recognition" is defined as $AR=(AB_i, HB_j)$, where $AB_i$ represents 10 abnormal behaviors of a user plus a normal state, namely $AB_i \in$ {Clapping Hands, Swinging Back and Forth, Spinning Circles, Flipping Fingers, Bumping Heads, Clapping Ears, Turning Fingers, Scratching, Walking on Tiptoe, Snapping Fingers, Normal Status}; and $HB_j$ represents five unhealthy states plus healthy states, i.e., $HB_j \in$ {Falling Down, Having Headache, Having Chest and Abdominal Pain, Having Back Pain, Having Neck Pain, Healthy Status}.

Then, a plurality of perception result types are determined according to the recognition result of the plurality of pattern recognition types output by "cloud pattern recognition" or "local pattern recognition", and perception results corresponding to a plurality of affective evaluation dimensions are respectively determined according to the plurality of perception result types.

Specifically, the perception results corresponding to a plurality of affective evaluation dimensions are obtained by an "achievement (perception result)" sub-model.

In the "achievement (perception result)" sub-model, at least five perception result types are determined based on the recognition result of the pattern recognition type.

First perception result type: "Friendly VS. Unfriendly" type. For example, the output result of "tactile sensing" and "gesture recognition" is "Friendly", which means that the user's interpretation of robot attitude is friendly. This type of extremely friendly result, neutral result and extremely unfriendly result are 1, 0 and −1 respectively.

Second perception result type: the output result of the "Positive VS. Negative" type. For example, "facial expression recognition", "natural language processing" and "context prompt" is "Positive", which means that the affective valence thereof is positive (for example, outputting a "dislike" in "natural language processing" would be classified as "Negative"). The extreme friendly result, neutral result and extreme unfriendly result of this type are 1, 0 and −1 respectively.

Third perception result type: "Valid VS. Invalid" type. For example, the output result of "image description" and "intention understanding" is "Valid", which means that after the robot verbally describes the object in the image or the robot verbally states the intention of the user in the interaction scene, the user will make a positive reaction. This type of extremely valid result, neutral result and extremely invalid result are 1, 0 and −1 respectively.

Fourth perception result type: the "Focused VS. Distracted" type. For example, the output result of "attention prediction" being "Focused" means that the robot may predict that the user "concentrates" on one or two objects in the interaction scene during the man-machine interaction. Conversely, "distraction" means that the user's line of sight and head direction cannot be "fixed" on one or two objects, but is often transferred from one object to another. "None" means that the user cannot "focus" on any object. This type of extreme focus result, none result and extreme distraction result are 1, 0 and −1, respectively;

Fifth type of perception result: the output of the "Normal VS. Unnormal" type, e.g., "behavior recognition" and "noise and interference" being "Unnormal" means that the robot may detect some abnormal/unhealthy behavior of the user (e.g., "walking on the tip" or "back pain"), or some noise/interference in the interactive scene, with extreme normal results and extreme abnormal results of 1 and −1, respectively.

It should be noted that the probability that most or all of these types of the same time with a very low probability, typically only a few results will occur. For each pattern recognition (i.e., pattern recognition in the sub-models (i.e., pattern recognition in the sub-models "Local Pattern Recognition" and "Cloud Pattern Recognition") and environmental perception (i.e., perception in the sub-models "Noise and Interference" and "context prompts"), the resulting value will be mapped to [−1, 1] or [−1, 0] using a fuzzy set, depending on which type of result it is classified into. Thereafter, the perception results corresponding to the plurality of affective evaluation dimensions are respectively determined according to a plurality of perception result types.

$$PF_{pl} = a_1 \cdot OT_1 + a_2 \cdot OT_2 + a_3 \cdot OT_3 + a_4 \cdot OT_4 + a_5 \cdot OT_5;$$

$$PF_{gc} = a_1 \cdot OT_1 + a_2 \cdot OT_2 + a_3 \cdot OT_3 + a_4 \cdot OT_4 + a_5 \cdot OT_5;$$

$$PF_{pc} = b_1 \cdot OT_1 + b_2 \cdot OT_2 + b_3 \cdot OT_3 + b_4 \cdot OT_4 + b_5 \cdot OT_5;$$

$$PF_c = c_1 \cdot OT_1 + c_2 \cdot OT_2 + c_3 \cdot OT_3 + c_4 \cdot OT_4 + c_5 \cdot OT_5;$$

$$PF_{as} = d_1 \cdot OT_1 + d_2 \cdot OT_2 + d_3 \cdot OT_3 + d_4 \cdot OT_4 + d_5 \cdot OT_5;$$

$$PF_{ao} = e_1 \cdot OT_1 + e_2 \cdot OT_2 + e_3 \cdot OT_3 + e_4 \cdot OT_4 + e_5 \cdot OT_5;$$

$$PF_{ac} = f_1 \cdot OT_1 + f_2 \cdot OT_2 + f_3 \cdot OT_3 + f_4 \cdot OT_4 + f_5 \cdot OT_5;$$

$$PF_u = g_1 \cdot OT_1 + g_2 \cdot OT_2 + g_3 \cdot OT_3 + g_4 \cdot OT_4 + g_5 \cdot OT_5;$$

$$PF_{mv} = h_1 \cdot OT_1 + h_2 \cdot OT_2 + h_3 \cdot OT_3 + h_4 \cdot OT_4 + h_5 \cdot OT_5;$$

Here, $PF_{pl}$, $PF_{gc}$, $PF_{pc}$, $PF_c$, $PF_{as}$, $PF_{ao}$, $PF_{ac}$, $PF_u$, $PF_{mv}$ respectively represent nine affective evaluation dimensions defined in the "personality" sub-model to evaluate perception results, namely, pleasantness, goal conduciveness, perceptual control, certainty, agent-self, agent-others, agent-environment, unfairness, and moral violation. $OT_1$, $OT_2$, $OT_3$, $OT_4 \in [-1, 1]$ and $OT_5 \in [-1, 0]$ respectively represent five perception result types. $a_1$, $a_2$, $a_3$, $a_4$, and as are the coefficients of these 5 types of perception results, respectively.

Thus, the perception result of the robot may be defined as follows:

$$F_{perceived} = (PF_{pl}, PF_{gc}, PF_{pc}, PF_c, PF_{as}, PF_{ao}, PF_{ac}, PF_u, PF_{mv}).$$

In the step S130 of some embodiments, the set of intentions (i.e., the reference signal) and the set of perception results (i.e., the perception signal) of the robot will result in an experienced affection, while at the same time the output resulting changes of the robot's cognition state and behavior will affect the user's behavior during the man-machine interaction. In other words, the difference (i.e., mismatch) between the reference signal and the perceptual signal will immediately result in an error signal, which will affect the affective behavior and affective thinking of the robot.

The assessment variable refers to a specific set of judgments that a robot can use to produce different affective responses. The main purpose of this sub-model is to output an error signal, i.e., a mismatch between the robot's intention set and the perception result, as an evaluation variable. Specifically, the error signal is output via the affection assessment variables as follows:

$$F_{error} = F_{intention} - F_{perceived};$$

where $F_{intention}$ is the robot's intention set and $F_{perceived}$ is the perception result.

Figure 3:
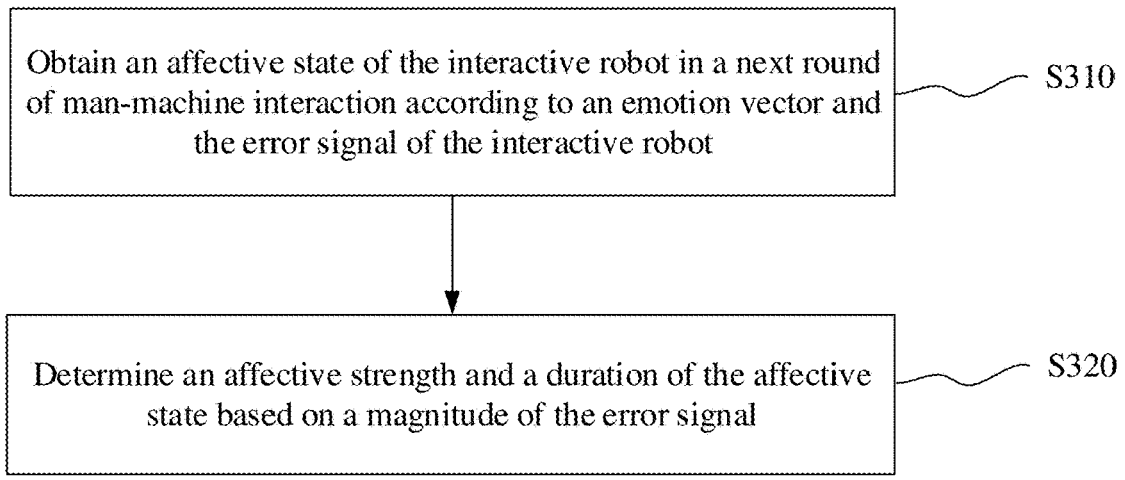
FIG. 3 is a schematic flow diagram of an affective computing method for an interactive robot according to an embodiment of the present disclosure.

In step S140 of some embodiments, referring to FIG. 3, FIG. 3 is a schematic flow diagram of an affective computing method for an interactive robot according to an embodiment of the present disclosure. As shown in FIG. 3, the, on the basis of the error signal, determining the affective state of the interactive robot in the next round of man-machine interaction includes but is not limited to steps S310 and S320:

step S310, obtaining an affective state of the interactive robot in a next round of man-machine interaction according to a mood vector and the error signal of the interactive robot; and step S320, determining an affective strength and a duration of the affective state based on a magnitude of the error signal.

Specifically, the affective state of the interactive robot in the next round of man-machine interaction is determined by the "affection-derived model", the "affection-intensity model" and the "affection" sub-model.

The "affection-derived model" sub-model is used to map the evaluation variables (i.e., error information) to an affective state and how the robot will react according to the evaluation mode. Specifically, the mood vector $E=(E_p, E_a, E_d)$ can be expanded into a second order differential equation:

$$M\ddot{E} + \Gamma\dot{E} + KE = F_{EA};$$

where M, $\Gamma$, K and $F_{EA}$ respectively represent an affective inertia matrix, an affective viscosity matrix, an affective elasticity matrix and an affective evaluation. The affection assessment $F_{EA}$ represents the overall result of the assessment variable, i.e., the error signal $F_{error}$. It will be appreciated that different responses to the same stimulus may be expressed by changing the affective coefficient matrix.

The "affective-intensity model" sub-model specifies the intensity of the affective response produced by a particular assessment. The affections of greater intensity and longer duration will be associated with greater errors that require the robot to change its "affection-consequence" model more appropriately to correct the error. Thus, the larger the error signal $F_{error}$, the greater the intensity of the affection, the longer the duration and the stronger the emotion response.

The "affection" sub-model is used to map, for each discrete affection the robot will experience, a mood vector $E=(E_p, E_a, E_d)$ into a PAD mental space consisting of three axes, pleasantness, arousal and dominance. For a mood vector $M=(M_p, M_a, 0)$ consisting of a pleasantness component $M_p$ and an arousal component $M_a$, it can also be mapped into the PAD mental space.

In some embodiments, after the, on the basis of the error signal, determining the affective state of the interactive robot in the next round of man-machine interaction, the method further includes:

outputting a response to a user by the interactive robot according to the affective state.

Specifically, the "robot behavior" model is used to determine observable physical behavior of the robot, such as facial expressions, based on affective states. Robots can express their observable physical behavior to users by facial expressions, gestures, speech, etc.

In some embodiments, after the, on the basis of the error signal, determining the affective state of the interactive robot in the next round of man-machine interaction, the method further includes:

updating the emotion cognition information about the interactive robot based on the affective state to obtain updated emotion cognition information;

wherein the updated emotion cognition information is used for determining the intention set of the interactive robot in the next round of man-machine interaction.

In particular, the "robot cognition" model is used to change the nature and content of the robot's cognitive process, such as the robot's beliefs, desires and intentions, according to the affective state. The error signal will cause the robot to generate an intention to correct the error signal. How strongly the desire to correct the error signal depends on the size of the error signal. Furthermore, since the robot is experiencing an affection, its emotion will be influenced to some extent by the affection.

Figure 4:
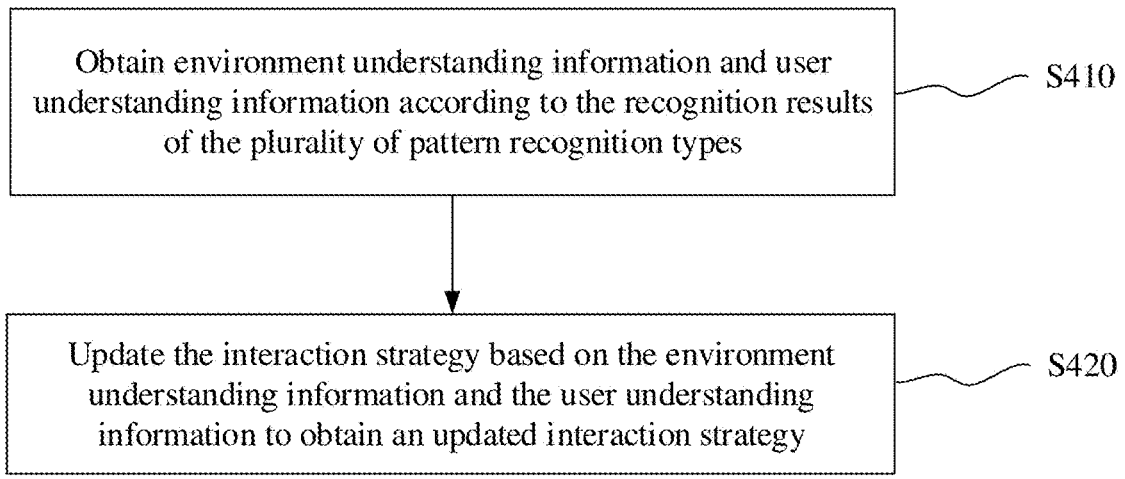
FIG. 4 is a schematic flow diagram of an affective computing method for an interactive robot according to an embodiment of the present disclosure.

In some embodiments, referring to FIG. 4, FIG. 4 is a schematic flow diagram of an affective computing method for an interactive robot according to an embodiment of the present disclosure. As shown in FIG. 4, after the obtaining recognition results of a plurality of pattern recognition types according to the perception information, the method further includes, but is not limited to, steps S410 and S420:

step S410, obtaining environment understanding information and user understanding information according to the recognition results of the plurality of pattern recognition types; and step S420, updating the interaction strategy based on the environment understanding information and the user understanding information to obtain an updated interaction strategy;

wherein the updated interaction strategy is used for determining the intention set of the interactive robot in the next round of man-machine interaction.

It will be appreciated that the interaction strategy takes into account that the noise and interference and context prompts may affect the user's emotions and the user's judgments about the robot's affections, and should take into account the results of the "scene and context understanding of users" sub-model. It needs to obtain the affective valence of context prompts. Then, the robot's emotion should coincide to some extent with the affective valence of the context prompts.

By outputting CUSU=(US, UU) through the "scene and context understanding of users" sub-model, where US represents scene understanding information mainly provided by the output of image description and sensing environment (i.e., combining scene description and sensing of noise, interference and context prompts) and UU represents user understanding information mainly provided by the output of other local and cloud-based pattern recognition (i.e., line-of-sight estimation, intentions, gestures), the robot can be coordinated to respond appropriately to surrounding affective backgrounds, making man-machine interaction more effective, efficient and pleasant.

It should be noted that during each round of interaction, the interactive robot updates the interaction strategy based on the identified environmental understanding information and user understanding information, and determines the intention set of the interactive robot in the next round of man-machine interaction by the updated interaction strategy. Thus, by means of multiple rounds of recursive interaction, the robot may constantly correct the error signal to enhance the user's sense of interactive experience and improve the interaction efficiency.

Figure 5:
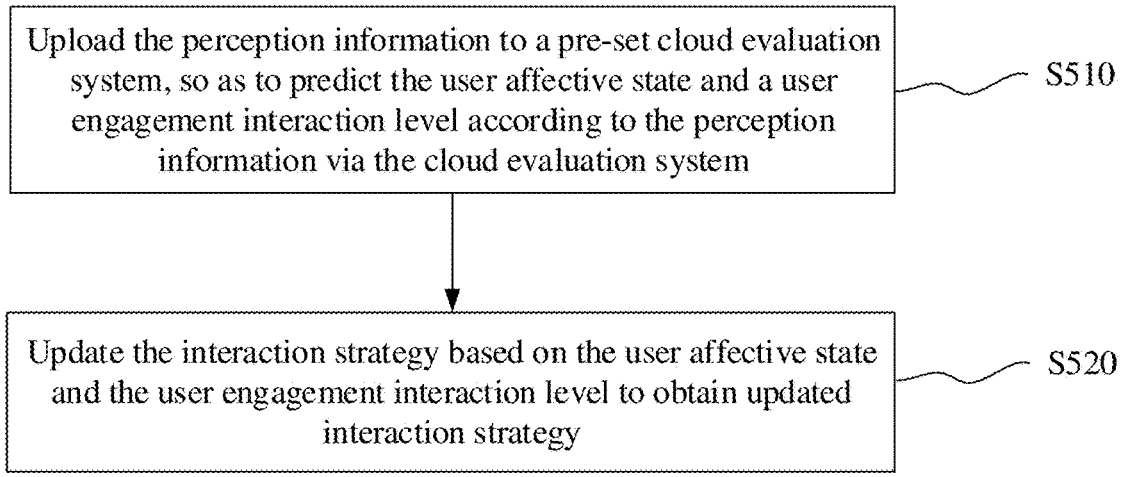
FIG. 5 is a schematic flow diagram of an affective computing method for an interactive robot according to an embodiment of the present disclosure.

In some embodiments, referring to FIG. 5, FIG. 5 is a schematic flow diagram of an affective computing method for an interactive robot according to an embodiment of the present disclosure. As shown in FIG. 5, after the acquiring perception information in the present round of man-machine interaction, the method further includes, but is not limited to, steps S510 and S520:

step S510, uploading the perception information to a pre-set cloud evaluation system, so as to predict the user affective state and a user engagement interaction level according to the perception information via the cloud evaluation system; and step S520, updating the interaction strategy based on the user affective state and the user engagement interaction level to obtain updated interaction strategy;

wherein the updated interaction strategy is used for determining the intention set of the interactive robot in the next round of man-machine interaction.

Figure 8:
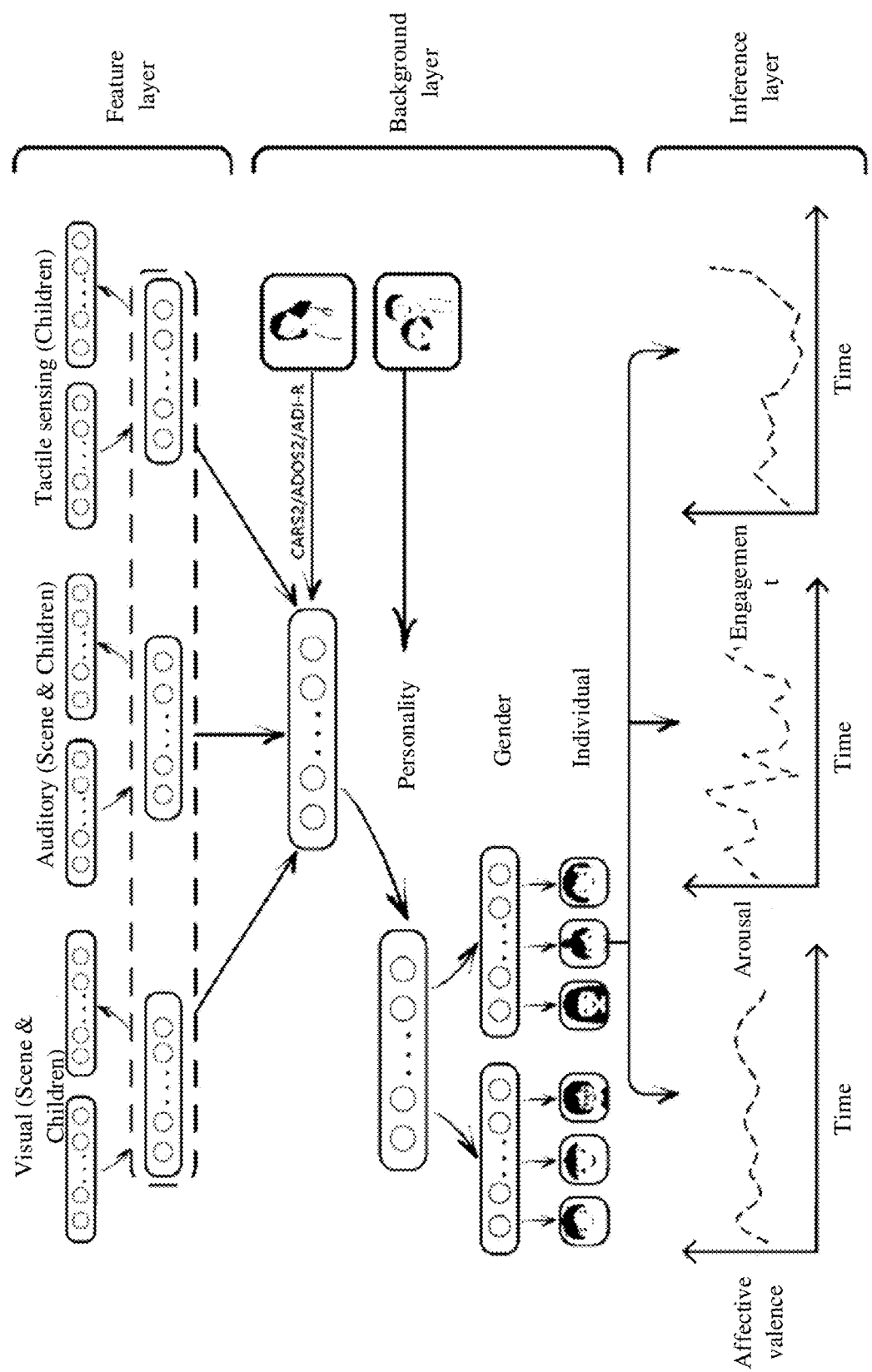
FIG. 8 is a structurally schematic diagram of a personalized perception of affect network according to an embodiment of the present disclosure.

It can be understood that the perception information is uploaded to a pre-set cloud evaluation system, and relevant insight about the user's cognition, behavior state and the user's intention to interact with the robot is provided by the cloud evaluation system. In the cloud evaluation system, an improved personalized perception of affect network (PPA-net) as shown in FIG. 8 is used. The network includes a feature layer, a background layer and a thrust layer. The feature layer uses the features of three modalities (visual, auditory and tactile) to perform feature fusion. At the background level, the input features are first enhanced by behavioral scores of children's intellectual, motor and linguistic abilities based on a pre-set autism rating scale, and then GPA-NET is trained and used at the personality, gender and individual level (using clones) to initialize the net weight of personalized PPA. In the inference layer, the inference layer makes specific assessments of the child's affective valence, arousal and engagement level.

In the modified PPA-net, the group-level perception of affect network (GPA-net) is trained by data extracted from the autism rating scale provided by the child's doctor or therapist and information extracted from the child's personality characteristics provided by the child's parents. Thus, by using the modified PPA-net, this sub-model can automatically be the "cloud interaction strategy" sub-model and continuously provide an estimate of the affective state (i.e., affective valence and arousal) and level of engagement of autistic children simultaneously. That is, the interaction strategy is influenced by the user evaluation information in addition to the scene understanding information and the user understanding information.

It should be noted that during each round of interaction, the interactive robot updates the interaction strategy based on the predicted affective state of the user and the user's level of engagement in the interaction, and determines the intention set of the interactive robot in the next round of man-machine interaction by the updated interaction strategy. Thus, by means of multiple rounds of recursive interaction, the robot may constantly correct the error signal to enhance the user's sense of interactive experience and improve the interaction efficiency.

In some embodiments, the method further includes:

uploading at least one of the environment understanding information, the user understanding information, the user affective state and the user engagement interaction level to a pre-set cloud sharing system;

wherein the cloud sharing system is configured for storing the environment understanding information, the user understanding information, the user affective state and the user engagement interaction level as sharing information, and providing the sharing information to an interaction robot communicatively connected to the cloud sharing system.

It will be appreciated that interaction data between the user and the robot is uploaded to the medical robot cloud platform for storage and evaluation to further evaluate the social and communication characteristics of the user. By the medical robot cloud platform, with the support of the sub-model "cloud evaluation system", the robots can share information (e.g., environment understanding information, user understanding information, user affective state and user interaction level). With the support of the "scene and user context understanding" sub-model, the robots can learn the ability to understand users and make decisions.

It needs to be stated that the embodiment of the present disclosure completes a data-driven mapping from an affection evaluation to an affection intensity by acquiring an intention set and a perception result of an interactive robot, and then according to an error signal generated by the both. The error signal further causes the robot to generate an affection, and affects cognition and behavior of the robot and affects user behavior between man-machine interactions. Then the interactive robot completes the perception of the user and the interactive environment and outputs the perception result, and finally the robot updates the cloud interaction strategy by the cloud platform. During each round of interaction, the interactive robot updates its intention set and perception results, and updates the affection caused by the error signal generated by both. Thus, by multiple rounds of recursive interaction, the robot continually modifies the error signal to enhance the user's interaction experience and improve the efficiency of the interaction.

The affective computing method of the interactive robot provided in the present disclosure has six attributes, namely, domain independence, integrating emotion, integrating personality, moral reasoning of data-driven mapping affection regulation from affection assessment to affection intensity, and combining with cloud robot technology, and is suitable for a social interactive robot, especially a robot facing a specific population (such as an autistic child, a patient with cerebral degeneration, a patient with depression, etc.).

Figure 9:
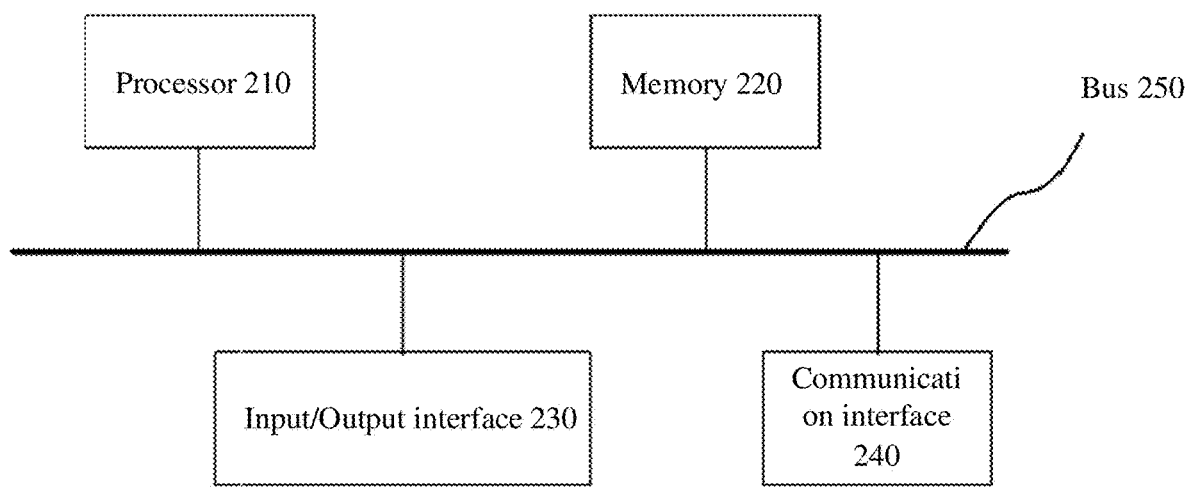
FIG. 9 is a structurally schematic view of hardware of an electronic device according to an embodiment of the present disclosure.

With reference to FIG. 9, FIG. 9 shows a structurally schematic view of hardware of an electronic device according to an embodiment of the present disclosure, the electronic device including:

a processor 210, which may be implemented by a general-purpose CPU (Central Processing Unit), a microprocessor, an application specific integrated circuit (ASIC), or one or more integrated circuits, etc., for executing relevant programs to implement the technical solutions provided in the examples of the disclosure; and a memory 220, which may be implemented in the form of a read-only memory (ROM), a static storage device, a dynamic storage device, or a random access memory (RAM); wherein the memory 220 may store an operating system and other application programs; when the technical solution provided by the embodiments of the present description is implemented via software or firmware, relevant program codes are stored in the memory 220, and the processor 210 invokes to execute the affective computing method for the interactive robot of the embodiments of the present disclosure;

an input/output interface 230 configured for realizing information input and output;

a communication interface 240 configured for realizing communication interaction between the present device and other devices, which can realize communication via a wired mode (such as USB, a network cable, etc.), and can also realize communication via a wireless mode (such as a mobile network, WIFI, Bluetooth, etc.); and a bus 250 that transmits information between each component of the device (e.g., a processor 210, a memory 220, an input/output interface 230, and a communication interface 240);

wherein the processor 210, 220, the input/output interface 230, and the communication interface 240 are communicatively coupled to each other within the device via the bus 250.

Embodiments of the present disclosure also provide a storage medium. The storage medium is a computer-readable storage medium for computer-readable storage. The storage medium stores one or more computer programs executable by one or more processors to implement the above-mentioned affective computing method for the interactive robot.

The memory serves as a computer-readable storage medium for storing software programs and computer-executable programs. In addition, the memory may include a high-speed random access memory and may also include a non-transient memory, such as at least one disk storage device, a flash memory device, or other non-transient solid-state storage devices. In some embodiments, the memory optionally includes a memory remotely located with respect to the processor, which may be connected to the processor via a network. Examples of such networks include, but are not limited to, the Internet, intranets, local area networks, mobile communication networks, and combinations thereof.

The embodiments described in the embodiments of the present disclosure are for the purpose of more clearly illustrating the technical solutions of the embodiments of the present disclosure, and do not constitute a limitation on the technical solutions provided by the embodiments of the present disclosure. A person skilled in the art would know that, as the technology evolves and new application scenes appear, the technical solutions provided by the embodiments of the present disclosure are also applicable to similar technical problems.

The device examples described above are merely illustrative, in which the elements illustrated as separate elements may or may not be physically separate, i.e., may be located at one place, or may be distributed across multiple network elements. Some or all of the modules may be selected according to actual needs to achieve the purpose of the solution of the example.

It will be appreciated by one of ordinary skill in the art that all or some of the steps of the methods, systems, devices disclosed above may be implemented as software, firmware, hardware, and appropriate combinations thereof.

In the above-mentioned examples, the description of each embodiment has its own emphasis, and parts of one embodiment which are not described or recorded in detail may be referred to the description of other embodiments.

The terms "first", "second", "third", "fourth", and the like in the description of the disclosure and in the above-described figures, if any, are used for distinguishing between similar objects and not necessarily for describing a particular sequential or chronological order. It should be understood that the data so used may be interchanged, where appropriate, so that the examples of the disclosure described herein can be implemented in an order other than those illustrated or described herein. Furthermore, the terms "comprise" and "comprising", as well as any variations thereof, are intended to cover a non-exclusive inclusion. For example, a process, a method, a system, an article, or a device that includes a list of steps or elements is not necessarily limited to those steps or elements expressly listed, but may include other steps or elements not expressly listed or inherent to such process, method, article, or device.

It should be understood that in the present disclosure, "at least one" means one or more, and "a plurality of" means two or more. "And/or", used to describe an associated relationship of an associated object, means that there may be three relationships. For example, "A and/or B" may mean that there are three cases of only A, only B, and both A and B, wherein A and B may be singular or plural. The character "/" generally indicates that the associated object is an "or" relationship. "At least one of", and the like, refers to any combination of these items, including any combination of singular or plural items. For example, at least one of a, b or c may represent a, b, c, "a and b", "a and c", "b and c", or "a, b and c", wherein a, b, c may be single or multiple.

In the several embodiments provided herein, it should be understood that the disclosed apparatus and method may be implemented in other ways. For example, the apparatus examples described above are merely illustrative. For example, the partitioning of elements is merely a logical function partitioning, and actual implementations may have additional partitioning, e.g., multiple elements or components may be combined or integrated into another system, or some features may be omitted, or not performed. In another aspect, the couplings or direct couplings or communication connections shown or discussed with respect to each other may be indirect couplings or communication connections via some interface, apparatus, or unit, and may be electrical, mechanical, or other forms.

The elements illustrated as separate elements may or may not be physically separate, and the components shown as elements may or may not be physical elements, i.e., may be located at one place, or may be distributed across multiple network elements. Some or all of the elements can be selected according to actual needs to achieve the purpose of the solution of the embodiment.

In addition, each functional unit in each embodiment of the present disclosure may be integrated in one processing unit, or may be physically present separately from each unit. Two or more units may be integrated in one unit. The above-mentioned integrated units may be implemented in the form of hardware or in the form of software functional units.

The integrated unit, if implemented in the form of a software functional unit and sold or used as a stand-alone product, may be stored in a computer-readable storage medium. Based on this understanding, the solution of the present disclosure may be essentially or a part of making a contribution to the prior art or a whole or part of the solution may be embodied in the form of a software product that is stored in a storage medium and that includes instructions for causing a computer device (which may be a personal computer, a server, or a network device, etc.) to perform all or part of the steps of the methods of the various examples of the present disclosure. The afore mentioned storage medium includes a USB flash disk, a mobile hard disk drive, a read-only memory (ROM), a random access memory (RAM), a magnetic or optical disk and other various media capable of storing programs.

Preferred embodiments of the embodiments of the present disclosure have been described above with reference to the accompanying drawings, which do not limit the scope of the claims of the embodiments of the present disclosure. Any modifications, equivalents, and improvements made by those skilled in the art without departing from the scope and spirit of the embodiments of the present disclosure should be considered to be within the scope and spirit of the embodiments of the present disclosure.

The invention claimed is:

1. An affective computing method for an interactive robot, wherein the method comprises:
   acquiring an intention set of an interactive robot, wherein the intention set is determined on the basis of a plurality of affective evaluation dimensions and event evaluation tendency information corresponding to each of the affective evaluation dimensions, and the affective evaluation dimensions are determined on the basis of personality characteristic information of the interactive robot;
   acquiring perception information in the present round of man-machine interaction and, according to the perception information, obtaining a perception result corresponding to the plurality affective evaluation dimensions;
   according to the perception result and the intention set of the interactive robot, obtaining an error signal; and
   on the basis of the error signal, determining the affective state of the interactive robot in the next round of man-machine interaction.

2. The affective computing method for the interactive robot according to claim 1, wherein the, according to the perception information, obtaining a perception result corresponding to the plurality affective evaluation dimensions comprises:
   obtaining recognition results of a plurality of pattern recognition types according to the perception information; and
   determining perception results corresponding to the plurality of affective evaluation dimensions based on recognition results of the plurality of pattern recognition types.

3. The affective computing method for the interactive robot according to claim 2, wherein the event evaluation tendency information is determined by emotion cognition information and a pre-set interaction strategy of the interactive robot;
   wherein the interaction strategy is used for updating personality characteristic information about the interactive robot.

4. The affective computing method for the interactive robot according to claim 3, wherein after the obtaining recognition results of a plurality of pattern recognition types according to the perception information, the method further comprises:
   obtaining environment understanding information and user understanding information according to the recognition results of the plurality of pattern recognition types; and
   updating the interaction strategy based on the environment understanding information and the user understanding information to obtain an updated interaction strategy;
   wherein the updated interaction strategy is used for determining the intention set of the interactive robot in the next round of man-machine interaction.

5. The affective computing method for the interactive robot according to claim 4, wherein after the acquiring perception information in the present round of man-machine interaction, the method further comprises:
   uploading the perception information to a pre-set cloud evaluation system, so as to predict the user affective state and a user engagement interaction level according to the perception information via the cloud evaluation system; and
   updating the interaction strategy based on the user affective state and the user engagement interaction level to obtain updated interaction strategy;
   wherein the updated interaction strategy is used for determining the intention set of the interactive robot in the next round of man-machine interaction.

6. The affective computing method for the interactive robot according to claim 5, wherein the method further comprises:
   uploading at least one of the environment understanding information, the user understanding information, the user affective state and the user engagement interaction level to a pre-set cloud sharing system;
   wherein the cloud sharing system is configured for storing the environment understanding information, the user understanding information, the user affective state and the user engagement interaction level as sharing information, and providing the sharing information to an interaction robot communicatively connected to the cloud sharing system.

7. An interactive robot, comprising:
   at least one processor; and
   a memory communicatively connected with the at least one processor;
   wherein the memory stores a computer program executable by the at least one processor to enable the at least one processor to perform the method according to claim 6.

8. An interactive robot, comprising:
   at least one processor; and
   a memory communicatively connected with the at least one processor;
   wherein the memory stores a computer program executable by the at least one processor to enable the at least one processor to perform the method according to claim 5.

9. An interactive robot, comprising:
   at least one processor; and
   a memory communicatively connected with the at least one processor;
   wherein the memory stores a computer program executable by the at least one processor to enable the at least one processor to perform the method according to claim 4.

10. An interactive robot, comprising:
    at least one processor; and
    a memory communicatively connected with the at least one processor;
    wherein the memory stores a computer program executable by the at least one processor to enable the at least one processor to perform the method according to claim 3.

11. An interactive robot, comprising:
at least one processor; and
a memory communicatively connected with the at least one processor;
wherein the memory stores a computer program executable by the at least one processor to enable the at least one processor to perform the method according to claim 2.

12. The affective computing method for the interactive robot according to claim 1, wherein the, on the basis of the error signal, determining the affective state of the interactive robot in the next round of man-machine interaction comprises:
obtaining an affective state of the interactive robot in a next round of man-machine interaction according to a mood vector and the error signal of the interactive robot; and
determining an affective strength and a duration of the affective state based on a magnitude of the error signal.

13. An interactive robot, comprising:
at least one processor; and
a memory communicatively connected with the at least one processor;
wherein the memory stores a computer program executable by the at least one processor to enable the at least one processor to perform the method according to claim 12.

14. An interactive robot, comprising:
at least one processor; and
a memory communicatively connected with the at least one processor;
wherein the memory stores a computer program executable by the at least one processor to enable the at least one processor to perform the method according to claim 1.

15. A computer-readable storage medium having a computer program stored, wherein the computer program when executed by a processor implements the method according to claim 1.

* * * * *